(12) United States Patent
Bereiter (10) Patent No.: US 6,581,104 B1
(45) Date of Patent: *Jun. 17, 2003

(54) LOAD BALANCING IN A DISTRIBUTED COMPUTER ENTERPRISE ENVIRONMENT

(75) Inventor: Thomas William Bereiter, Austin, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/724,662

(22) Filed: Oct. 1, 1996

(51) Int. Cl.[7] ............................................. G06F 15/16
(52) U.S. Cl. ...................... 709/232; 709/233; 709/213
(58) Field of Search ................................. 395/650, 750, 395/200.53, 200; 370/60, 234, 395, 232, 235, 253, 389, 227; 709/224, 219, 203, 201, 229, 232, 200, 105, 213, 233; 703/21; 705/9

(56) References Cited

U.S. PATENT DOCUMENTS

| | | | | |
|---|---|---|---|---|
| 4,551,833 A | | 11/1985 | Turner ......................... 370/236 |
| 5,142,531 A | | 8/1992 | Kirby .......................... 370/254 |
| 5,204,949 A | * | 4/1993 | Yasue et al. .................. 395/200 |
| 5,283,897 A | * | 2/1994 | Georgiadis et al. ........... 395/650 |
| 5,287,508 A | * | 2/1994 | Hejna, Jr. et al. ........... 395/650 |
| 5,295,139 A | | 3/1994 | Palmer |
| 5,377,327 A | | 12/1994 | Jain et al. ............... 395/200.65 |
| 5,406,559 A | | 4/1995 | Edem et al. .................. 370/516 |
| 5,422,879 A | * | 6/1995 | Parsons et al. ................ 370/60 |
| 5,425,023 A | | 6/1995 | Haraguchi et al. |
| 5,434,848 A | | 7/1995 | Chimento, Jr. et al. ..... 370/232 |
| 5,440,719 A | * | 8/1995 | Hanes et al. .................... 703/21 |
| 5,452,350 A | * | 9/1995 | Reynolds et al. ........... 379/220 |
| 5,491,801 A | | 2/1996 | Jain et al. .............. 395/200.71 |

(List continued on next page.)

FOREIGN PATENT DOCUMENTS

| | | |
|---|---|---|
| EP | 0498967 | 2/1991 |
| WO | 9524812 | 9/1995 |

OTHER PUBLICATIONS

Iida et al, Autonomous routing scheme for large scale network based on neural processing IEEE, 1989.*
Douglas C.Schmidt, Tim Harrison and Ehab Al–Shaer. [www.acl.lanl/CORBA/#DOCS], Jun. 1995.*

(List continued on next page.)

Primary Examiner—Mark Powell
Assistant Examiner—Thong Vu
(74) Attorney, Agent, or Firm—Jeffrey S. LaBaw; Joseph R. Burwell; David H. Judson (57) ABSTRACT

A method of balancing loads during data distribution in a managed network environment wherein at least one gateway machine services a plurality of endpoints. System management tasks include data distributions, which are normally initiated at the gateway and distributed to all managed endpoints. Load balancing is achieved by setting a load parameter for each subnet of each network path between the gateway machine and an endpoint machine serviced thereby. The load parameter is selectable and identifies an amount of network bandwidth that may be used by a particular data distribution over the segment. Prior to initiating a distribution, the effective load that a given subnet will "see" when the operation begins is then calculated. If that effective load for any subnet exceeds that subnet's respective load parameter, the data distribution rate is altered for the overall network path. This technique effectively balances network loads and makes more efficient use of resources.

16 Claims, 5 Drawing Sheets

U.S. PATENT DOCUMENTS

| | | | | |
|---|---|---|---|---|
| 5,506,834 A | * | 4/1996 | Sekihata et al. | 370/253 |
| 5,515,371 A | | 5/1996 | Venters | 370/517 |
| 5,517,643 A | * | 5/1996 | Davy | 395/650 |
| 5,581,610 A | * | 12/1996 | Hooshiari | 379/133 |
| 5,598,566 A | * | 1/1997 | Pascucci et al. | 395/750 |
| 5,600,637 A | * | 2/1997 | Kikuta | 370/389 |
| 5,652,751 A | * | 7/1997 | Sharony | 370/227 |
| 5,712,981 A | * | 1/1998 | McKee et al. | 709/241 |
| 5,717,745 A | * | 2/1998 | Vijay et al. | 379/112 |
| 5,734,652 A | * | 3/1998 | Kwok | 370/395 |
| 5,742,587 A | * | 4/1998 | Zornig et al. | 370/235 |
| 5,774,668 A | * | 6/1998 | Choquier et al. | 709/203 |
| 5,793,976 A | * | 8/1998 | Chen et al. | 709/224 |
| 5,799,002 A | * | 8/1998 | Krishnan | 370/234 |
| 5,805,072 A | * | 9/1998 | Kakemizu | 370/408 |
| 5,889,761 A | * | 3/1999 | Yamato | 370/231 |
| 5,923,849 A | * | 7/1999 | Venkatraman | 709/224 |
| 5,925,100 A | * | 7/1999 | Drewry et al. | 709/219 |
| 5,978,851 A | * | 11/1999 | Kayama et al. | 709/232 |

OTHER PUBLICATIONS

IBM Technical Disclosure Bulletin "Connection Establishment in Hierarchical Networks with Bandwidth Management," vol. 35, No. 6, Nov. 1992.

IBM Technical Disclosure Bulletin "Predicting Congestion in Packet Switch Networks," vol. 18 No. 6, Nov. 1975.

* cited by examiner

LOAD BALANCING IN A DISTRIBUTED COMPUTER ENTERPRISE ENVIRONMENT

TECHNICAL FIELD

The present invention is directed to managing a large distributed enterprise environment and, more particularly, to regulating how data is distributed among computing resources in the managed environment.

BACKGROUND OF THE INVENTION

The problem of designing the most-efficient message distribution hierarchy in a complex network must take into consideration a number of factors including network topology, network bandwidth and machine resources. A well-designed distribution method would be both efficient and fault tolerant. Because of the varying capabilities of the actual networks in use today, however, it is not possible to select, a priori, a distribution method that will work well for all networks. This problem is exacerbated in a large, geographically-dispersed network environment. One such known environment includes a management framework comprising a server that manages a number of nodes, each of which has a local object database that stores object data specific to the local node. The server is used to perform a variety of system management tasks, including a multi-plexed distribution service that performs an efficient one-to-many data distribution. A data distribution is typically initiated at each target node with an object method invocation.

It is also known in such distribution schemes to provide a network load tunable parameter that can be set to limit the amount of data a distribution will write per unit time. Such techniques, however, do not adequately address the serious loading problems that can occur when multiple endpoints seek to obtain distribution service at the same time. The following illustrates this problem in a representative distribution hierarchy. Assume a repeater in the network fans-out to 50 machines, the machines are all on separate T1 links, and the network has a 10 mbit local area network (LAN) that must be crossed to get to a router running the T1 links. The repeater has a sustainable send rate of 750 KB/sec, and the netload tuning parameter is set to 500 KB/sec to keep LAN traffic manageable. In this example, the LAN becomes a "bottleneck" because only 4–5 endpoints (500/1.5) can be kept busy in parallel. If the distribution is made to more than 5 endpoints in parallel, all distributions are slowed down. Sending the distribution to all 50 machines has the effect of making each network only one tenth as busy. The problem is made even worse if the endpoint machines include relatively slow modems (e.g., less than 9600 baud), which is quite common since endpoint machines are typically the last part of the enterprise to be upgraded. On these old networks, even a single 16 K write operation saturates the network for close to 30 seconds, making it impossible to do other work.

Thus, it would be desirable to provide an improved mechanism to distribute data efficiently in a managed network environment.

BRIEF SUMMARY OF THE INVENTION

It is a primary object of the invention to provide an efficient one-to-many data distribution service for a distributed enterprise computing environment.

It is a more specific object of the invention to control distribution of data in a large, geographically-dispersed managed enterprise having a plurality of endpoint machines.

It is another object of the invention to enable an enterprise to place substantially all of its computing resources on a network that is managed in a reliable, cost-effective manner, and to provide an efficient data distribution service within such enterprise.

It is a further object of the invention to provide a multi-plexed distribution scheme within a managed environment wherein distribution loads within one or more networks connected to respective endpoint machines are balanced.

Still another object of the invention is to provide load control for each network that connects an endpoint machine to a management node in the enterprise environment.

Another object of the invention is to facilitate parallel distribution to endpoint machines in a large, distributed enterprise environment.

It is another object of the invention to use actual network load information during a data distribution to ensure that each network does not exceed a desired load value.

It is still another object of the invention to meet the needs of customers with very large and geographically-dispersed networks and, more particularly, to significantly expand the data distribution capabilities of the network administrators.

These and other objects are achieved in a large distributed enterprise that includes computing resources organized into one or more managed regions, each region being managed by a management server servicing one or more gateway machines, with each gateway machine servicing a plurality of endpoint machines. A system management framework is preferably "distributed" on the gateway machines and the one or more endpoint machines to carry out system management tasks.

To facilitate balanced distribution of data, a network administrator first sets a load parameter identifying an amount of network bandwidth that may be consumed by a particular data distribution over each subnet of each network path between the gateway machine and the endpoints serviced by that gateway. Prior to initiating a data distribution, a calculation is made of the effective load for each subnet that will be affected by (i.e. that will handle) the data distribution. A determination is then made regarding whether the effective load in any subnet that is affected by the data distribution exceeds the load parameter for that subnet. If so, the data distribution is altered by inserting one or more delays in the rate at which data is transmitted over the affected network path from the gateway. The data distribution, as altered, is then initiated. These steps are repeated for a new data distribution, or at predetermined intervals.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
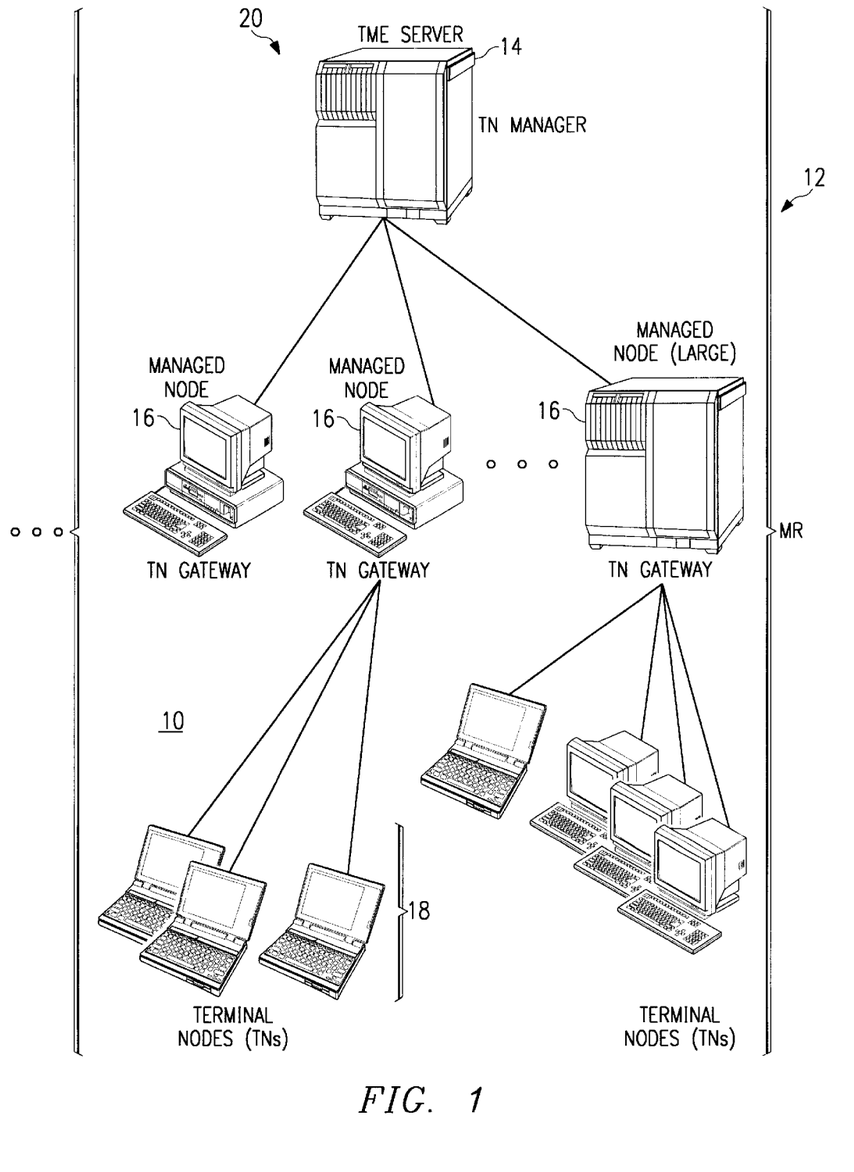
FIG. 1 illustrates a simplified diagram showing a large distributed computing enterprise environment in which the present invention is implemented.

Referring now to FIG. 1, the invention is preferably implemented in a large distributed computer environment 10 comprising up to thousands or even tens of thousands of "nodes." The nodes will typically be geographically dispersed and the overall environment is "managed" in a distributed manner. Preferably, the managed environment (ME) is logically broken down into a series of loosely-connected managed regions (MR) 12, each with its own management server 14 for managing local resources with the MR. The network typically will include other servers (not shown) for carrying out other distributed network functions. These include name servers, security servers, file servers, threads servers, time servers and the like. Multiple servers 14 coordinate activities across the enterprise and permit remote site management and operation. Each server 14 serves a number of gateway machines 16, each of which in turn support a plurality of "endpoints" 18. The server 14 coordinates all activity within the MR using a terminal node manager 20.

Figure 2:
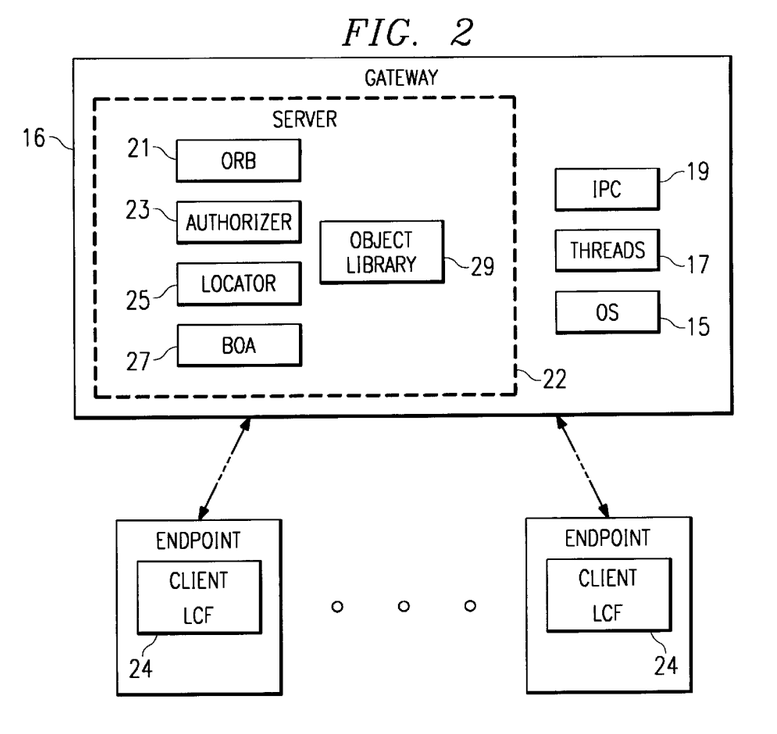
FIG. 2 is a block diagram of a preferred system management framework illustrating how the framework functionality is distributed across the gateway and its endpoints within a managed region.

Referring now to FIG. 2, each gateway machine 16 runs a server component 22 of a system management framework. The server component 22 is multi-threaded runtime process that comprises several components: an object request broker or "ORB" 21, an authorization service 23, object location service 25 and basic object adaptor or "BOA" 27. Server component 22 also includes an object library 29. Preferably, the ORB 21 runs continuously, separate from the operating system, and it communicates with both server and client processes through separate stubs and skeletons via an interprocess communication (IPC) facility 19. In particular, a secure remote procedure call (RPC) is used to invoke operations on remote objects. Gateway machines 16 also includes an operating system 15 and a threads mechanism 17.

The system management framework includes a client component 24 supported on each of the endpoint machines 18. The client component 24 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like.

Figure 3:
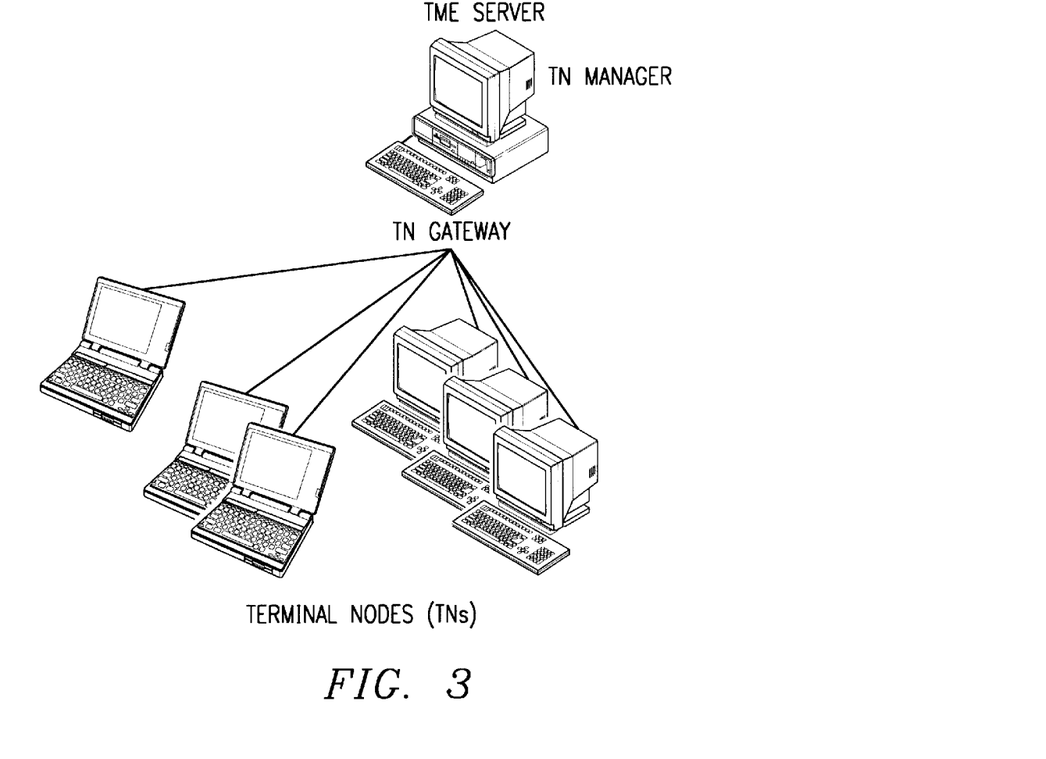
FIG. 3 illustrates a smaller "workgroup" implementation of the enterprise in which the server and gateway functions are supported on the same machine.

In the large enterprise such as illustrated in FIG. 1 preferably there is one server per MR with some number of gateways. For a workgroup-size installation (e.g., a local area network or "LAN") such as illustrated in FIG. 3, a single server-class machine may be used as the server and gateway. References herein to a distinct server and one or more gateways should thus not be taken by way of limitation as these devices may be combined into a single platform. For intermediate size installations the MR grows breadth-wise, with additional gateways then being used to balance the load of the endpoints.

The server is the top-level authority over all gateway and endpoints. The server maintains an endpoint list, which keeps track of every endpoint in a managed region. This list contains all information necessary to uniquely identify and manage endpoints including, without limitation, such information as name, location, and machine type. The server also maintains the mapping between endpoint and gateway, and this mapping is dynamic. Based on site-specific settings, it is possible to reassign endpoints when gateways go down or to automatically add new endpoints as they appear on the network.

As noted above, there are one or more gateways per managed region. A gateway is a full managed node that has been configured to operate as a gateway. Initially, a gateway "knows" nothing about endpoints. As endpoints login (discussed below), the gateway builds an endpoint list for its endpoints. The gateway's duties include: listening for endpoint login requests, listening for endpoint upcall requests, and (its main task) acting as a gateway for method invocations on endpoints.

Figure 2A:
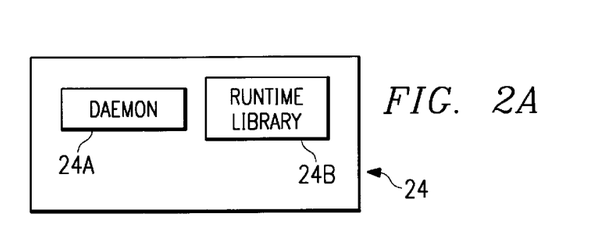
FIG. 2A is a block diagram of the LCF client component of the system management framework.

As also discussed above, the endpoint is a machine running the system management framework client component, which is referred to herein as the low cost framework (LCF). The LCF has two main parts as illustrated in FIG. 2A: the lcf daemon 24a and an application runtime library 24b. The LCF daemon 24a is responsible for endpoint login and for spawning application endpoint executables. Once an executable is spawned, the LCF daemon 24a has no further interaction with it. Each executable is linked with the application runtime library 24b, which handles all further communication with the gateway.

Preferably, the server and each of the gateways is a computer or "machine." For example, each computer may be a RISC System/6000® (a reduced instruction set or so-called RISC-based workstation) running the AIX (Advanced Interactive Executive) operating system, preferably Version 3.2.5 or greater. The AIX operating system is compatible at the application interface level with the UNIX operating system, version 5.2.

The various models of the RISC-based computers are described in many publications of the IBM Corporation, for example, RISC System/6000, 7073 and 7016 POWERstation and POWERserver Hardware Technical Reference. Order No. SA23-2644-00. The AIX operating system is described in *AIX Operating System Technical Reference,* published by IBM Corporation, First Edition (November, 1985), and other publications. A detailed description of the design of the UNIX operating system is found in a book by Maurice J. Bach, *Design of the Unix Operating System*, published by Prentice-Hall (1986). Suitable alternative machines include: an IBM-compatible PC 486 or higher running Novell UnixWare 2.0, an AT&T 3000 series running AT&T UNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3. Of course, other machines and/or operating systems may be used as well for the gateway and server machines.

Each endpoint is also a computer. In one preferred embodiment of the invention, most of the endpoints are personal computers (e.g., desktop machines or laptops). In this architecture, the endpoints need not be high powered or complex machines or workstations. One or more of the endpoints may be a notebook computer, such as an IBM ThinkPad® machine, or some other Intel x86 or Pentium®-based computer running Windows 3.1 or greater operating system. IBM® or IBM-compatible machines running under the OS/2® operating system may also be implemented as the endpoints. For more information on the OS/2 operating system, the reader is directed to OS/2 2.0 Technical Library. Programming Guide Volumes 1–3 Version 2.00, Order Nos. 10G6261, 10G6495 and 10G6494.

As noted above, the server-class framework running on each gateway machine is multi-threaded and is capable of maintaining hundreds of simultaneous network connections to remote machines. A thread of execution may be a separate process (in the UNIX paradigm) or a separate thread in a single process (in the POSIX pthreads paradigm). POSIX is a series of standards for applications and user interfaces to open systems, issued by the Institute of Electrical and Electronics Engineers Inc. (IEEE). The IEEE POSIX.1c is the emerging standard for user level multi-threaded programming and is implemented in the served component of the systems management framework. All objects in this framework exhibit "state." This state may be completely persistent, in which case it is represented by attributes in the object database associated with a gateway machine, or the state may be non-persistent.

An endpoint is added to the enterprise by first copying the LCF daemon 24a to the endpoint's disk. This may be done automatically through network login scripts, manually by inserting a diskette, or by preloading the boot disk at the time of purchase or license. The first time the LCF daemon is installed, and on each subsequent boot, the LCF daemon attempts to login to its gateway. If the gateway is not known or if the gateway does not respond, the daemon issues a broadcast requesting a gateway. For completely new endpoints the broadcast is ultimately forwarded to the server. If a gateway hears a broadcast or a login request from an endpoint it recognizes, the gateway services the request itself.

When the server receives an endpoint's gateway request broadcast, the server consults its endpoint list to see which gateway the endpoint belongs to. For new endpoints, or when migrating between gateways, the server uses a site specific policy to choose the correct gateway (e.g., by subnet). The gateway is informed of its new endpoint, the gateway informs the endpoint, and the login completes.

An endpoint preferably communicates only with its gateway. Requiring all endpoint communication to pass through a single gateway greatly simplifies connectivity issues. After a successful login, both endpoint and gateway know a working address by which to address one another. If a DHCP address lease expires, or anything changes in the network topology, then the next endpoint login will establish the new endpoint to gateway addresses.

There is no absolute maximum number of endpoints that can be supported by a single gateway. The design strategy is that the gateway is always in control of its own workload. The endpoints are not allowed to send data unless granted permission. When an endpoint has results to return, or if it wishes to make an upcall, it sends a very small message requesting service. The gateway queues the request and services the queue as time allows. When an endpoint has large results, it must break the results into chunks and may only send a chunk when instructed to do so. This strategy makes it possible for a single gateway to support thousands of endpoints, albeit somwhat slowly. If a better quality of service is desired, it is simply a matter of adding more gateways.

Endpoint methods are normal CORBA methods (as discussed below) linked with IDL compiler generated code and the endpoint application runtime library 24b. This results in a native executable designed to be spawned by the LCF daemon 24a. Any number of methods may be implemented in a single executable.

Preferably, an endpoint is installed without any methods. Method executables are downloaded from the gateway as required. When the LCF daemon receives a method invocation request, it checks the local disk cache. If there is a cache miss, or a version mismatch, then a new executable is downloaded. In this way, an endpoint can start with nothing and then build a working set of methods for fast execution.

Figure 4A:
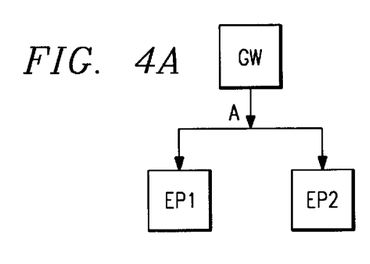
FIGS. 4A–4D illustrate several representative network connections between a gateway machine and a pair of endpoint machines in a representative managed network.
Figure 4B:
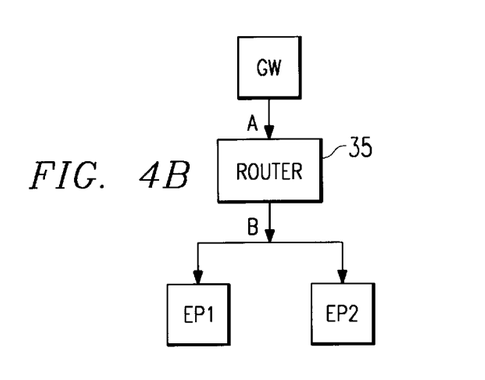
Figure 4C:
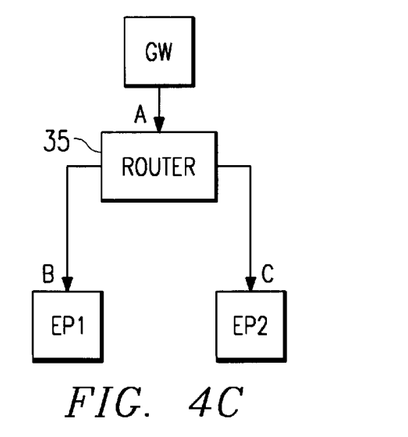
Figure 4D:
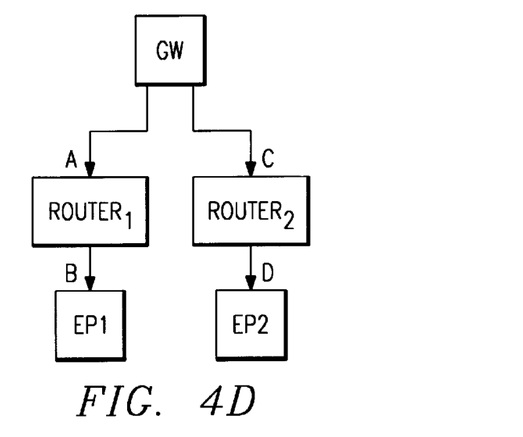

FIGS. 4A–4E illustrate how a particular gateway (GW) may be connected to a pair of endpoint machines (EP1 and EP2). As seen in FIG. 4A, the gateway GW is connected directly to each of EP1 and EP2 (i.e. without any intermediate device) and thus the path between the GW and each endpoint has a single path segment, which is labeled A. In FIG. 4B, a router 35 is located in the path but both endpoints EP1 and EP2 are directly connected to the router, and thus this configuration generates a pair of segments A and B in the path (between the GW and each respective endpoint). FIG. 4C shows yet another alternative wherein each of the endpoints EP1 and EP2 connect to different branch points in the router 35, and this configuration also creates two path segments (A and B) for each path between the GW and each endpoint. FIG. 4D represents another alternative configuration wherein a second router 37 is used. In this situation, the path between GW and EP1 includes two path segments (A and B), while the path between GW and EP2 includes two separate path segments (C and D). Thus, as can be seen by these examples, the path between the gateway and an endpoint serviced by the gateway can traverse either one or two segments (which are, in effect, networks). Each additional endpoint serviced by the gateway can add zero (FIG. 4A), one (FIG. 4B) or two (FIG. 4C) new paths, depending on the existence (of lack thereof) of the intermediate router.

Figure 5:
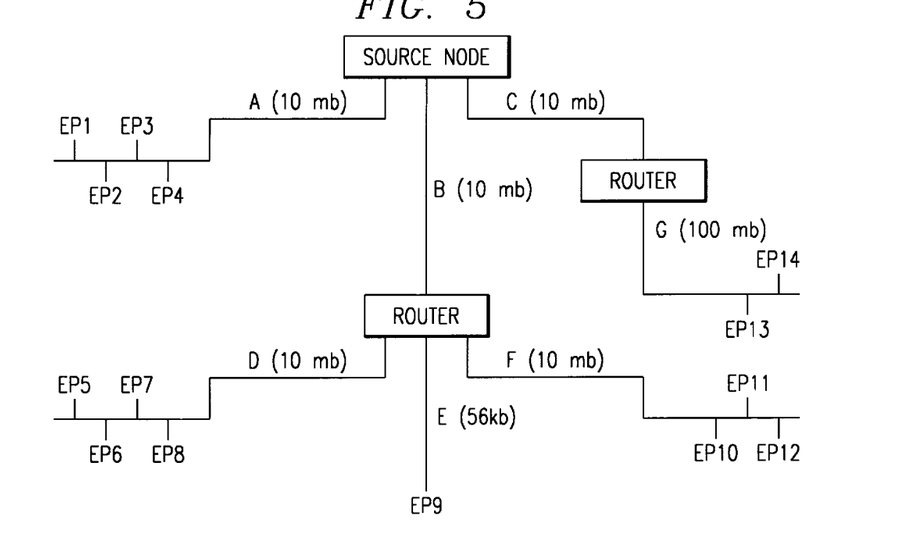
FIG. 5 illustrates a superset of all of the network connections shown in FIGS. 4A–4D showing a representative portion of the managed network.

FIG. 5 shows a superset of the various network configurations illustrated in FIGS. 4A–4D, and thus illustrates how larger enterprise connections may be formed. This network includes a source node 41, routers 43 and 45, and fourteen (14) endpoints EP1–EP14 distributed across six (6) subnets (labeled "A" through "G"). In this example, it is assumed that subnets A, B, C, D and F have a maximum speed of 10 megabits per second (mb/s), subnet E has a maximum speed of 56 kilobits per second (kb/s), and subnet G has a maximum speed of 100 mb/s. All data distributions are assumed to start at the source node (which is typically the management server and/or a gateway).

A distribution from one node (such as the source node) to multiple endpoints appears on the network of FIG. 5 as multiple simultaneous one-to-one distributions. According to the invention, tunable parameters allow a site administrator to specify what maximum percentage of available bandwidth to use for each subnet A–G. As used herein, the "effective" load of each subnet is computed (for example) by recording the number of bytes written to a subnet per unit time. If two operations are running in parallel on the same subnet, each will contribute to the effective load. For example, if during a one second interval 16 k bytes have been written, the data rate is 16 kB/s; if the subnet in question is a 1 mb line, the percentage used is thus calculated as (16 kB*8 bit)/1 mb=12.5%.

According to the present invention, several load balancing concepts are implemented. When a distribution crosses two subnets, the load for both subnets is considered and the busiest of the two subnets preferably is used to determine the amount of "delay" that should be inserted into the overall distribution to balance the load. Also, the invention takes into consideration the fact that all operations contribute to the effective loads even though delays may be added on an individual operation basis. These concepts are illustrated by the examples set forth below, which are provided in reference to the network shown in FIG. 5.

Assume a single distribution to endpoint EP9 in FIG. 5. Each packet crosses subnets B and E. Assume that the network load parameter is set to 80% for subnet B and to 50% for subnet E. After one second of operation, 4 k bytes have been sent. On subnet B, the effective load is 4 kB/10 mb=0.3%. On subnet E, however, the load is 4 kB/56 kb=57%. Subnet B is thus well under maximum load, but subnet E is too busy. According to the invention, a short delay is then inserted to get the effective load back under 50%. Even though subnet B is near idle, the next write must be delayed to reduce the load on subnet E.

Now, assume a distribution to endpoints EP1–EP4, which are all endpoints on subnet A. In this example, the load parameter for subnet A is assumed to be 25%. After one second, 100 k bytes have been sent to each endpoint. Since the same 100 k has been sent to four different endpoints, the 100 k has crossed subnet A four (4) times. The load on subnet A is (4*100 kB)/10 mb=31%. A delay is thus required since this value exceeds the load parameter.

The following example assumes a distribution to endpoints EP5, EP6, EP11 and EP12. After one second, 100 k bytes have been sent to each endpoint. The load on subnet B is (4*100 kB)/10 mb=31%. The load on each of subnets D and F is (2*100 kB)/10 mb=15.5%.

Now, assume that the distribution is to all endpoints. After one second, 100 k bytes would have been sent to each endpoint. The effective loads are then calculated as follows:

$A=(4*100 \text{ kB})/10 \text{ mb}=31\%$ $B=(8*100 \text{ kB})/10 \text{ mb}=62\%$ $C=(2*100 \text{ kB})/10 \text{ mb}=15.5\%$ $D=(4*100 \text{ kB})10 \text{ mb}=31\%$ $E=100 \text{ kB}/56 \text{ kb}=1400\%$ $F=(3*100 \text{ kB})/10 \text{ mb}=23\%$ $G=(2*100 \text{ kB})/100 \text{ mb}=1.5\%$ Subnet E, with an effective load of 1400%, requires a long delay. In such case, router 43 will buffer the 100 kB and release data at the maximum rate subnet E can accept. According to the invention, delays are inserted and the network write size is reduced to get the effective rate back to the configured network load. This will have the effect of making subnet B less busy as well.

According to the invention, a mechanism is provided for effectively managing the large scale distribution of data from one or more gateway machines to the endpoints serviced by those machines in a managed enterprise. Typically, a particular gateway is connected to one or more endpoint machines serviced by the gateway according to the topology illustrated in one or more of the FIGS. 4A–4D. As noted above, FIG. 5 is one such example. The mechanism is described generally in the flowchart of FIG. 6 with respect to a particular gateway machine and its related endpoints. Of course, the method may be carried out for multiple gateway machines in a parallel process but, for simplicity, only a single gateway is shown.

Figure 6:
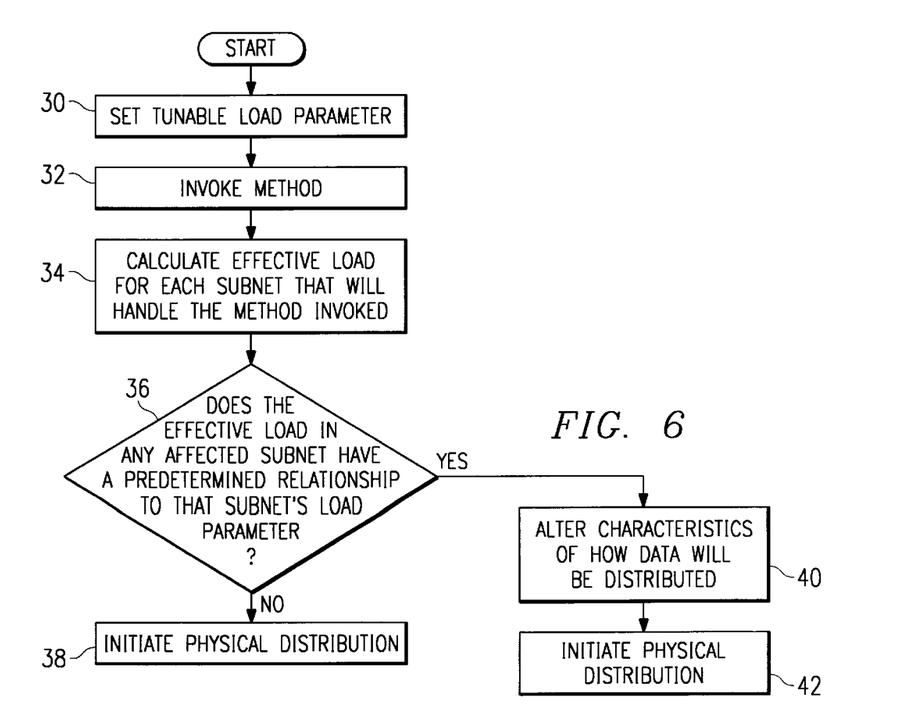
FIG. 6 is a flowchart showing a preferred method of managing a data distribution according to the present invention.

An exemplary method begins at step 30 by setting a tunable load parameter, preferably for each subnet of each network path between the gateway machine and an endpoint machine. Network paths that need not load-balanced can be omitted if desired. The load parameter is selectable and identifies a maximum percentage of available bandwidth that may be consumed by a particular download operation over that subnet. This value may depend on numerous factors including the type of connection, the type of data, the speed and memory characteristics of the endpoint, whether routers or other intermediate devices are used between the gateway and its endpoints, etc. At step 32, a data distribution is selected for initiation, typically (as will be described in more detail below) by having an endpoint method invoke an object supported on the gateway. A data distribution is sometimes referred to herein as a "write" operation since data is being written from a source node to a number of managed endpoints. As illustrated in FIG. 5, the various connections and characteristics of the network paths and subnets determine an "effective" load in each subnet of an affected network path. A network path is said to be "affected" if the data distribution will be provided over that path. At step 34, and preferably before the actual distribution is physically started on the wire(s), a calculation is made of the effective load in each subnet affected by the method invocation. At step 36, a test is made to determine whether the effective load in each affected subnet has a predetermined relationship (e.g., is greater than) the load parameter for that subnet. If the outcome of the test at step 36 is negative, no load balancing is necessary, and the routine continues by initiating the distribution at step 38. If, however, the outcome of the test at step 36 is positive, at least one of the subnets will be overloaded (given the predetermined load parameter for that subnet), and thus some load balancing is necessary. In this case, the routine continues at step 40 to alter the characteristics of the distribution (typically by inserting some timing delay or controlling the buffering of data in an upstream router) to reduce the effective load in the affected subnet(s) when the data is actually sent in step 42.

Therefore, as noted above, the load balancing algorithm preferably checks for the possibility of subnet overload prior to the write operation so that the data distribution may then be altered in some meaningful way and then carried out within the preset subnet load parameters. This "balancing" technique is performed each time a write operation is initiated, although it may be carried out in a different manner. Thus, the technique may be performed on a continuous basis (e.g., at regular intervals, such as every 2 minutes) as data is being distributed over the network. This takes into consideration the fact that all operations contribute to the effective loads even though delays may be added on an individual operation basis.

Thus, prior to a a write operation, the effective load in each of the subnets (over which the data distribution will occur) of a given network path between a gateway and an endpoint serviced by the gateway is evaluated and a load balancing algorithm is applied to ensure that, when the write operation is actually implemented, data distribution through the affected subnets does not exceed the effective bandwidth of any such subnet. This advantageous result is achieved by calculating an "effective" load for each subnet affected by the data distribution. Prior to initiating the operation, a determination is made whether the effective load exceeds (or perhaps approaches) some preset threshold (which is preferably selectable). If so, the overall distribution will be slowed down or otherwise altered to prevent one particular subnet (usually the most heavily loaded) from unbalancing the rest of the distribution. In effect then, the subnets are "charged" against their allotted bandwidth based on the number of subnets that exist.

As used herein, an effective load may "exceed" a given load parameter by even where the effective load is substantially the same as the load parameter. Of course, the data distribution speed may be altered when the effective load bears some given relationship (e.g., 95%) of the load parameter. All such variations are well within the scope of the inventive load balancing technique.

Although in the preferred embodiment the degree to which the data distribution characteristics must be modified are calculated before the distribution occurs, the invention also contemplates monitoring the actual load values during a first data distribution and then adjusting the rate of a second data distribution based on the network load constraints existing during the first distribution.

Figure 7:
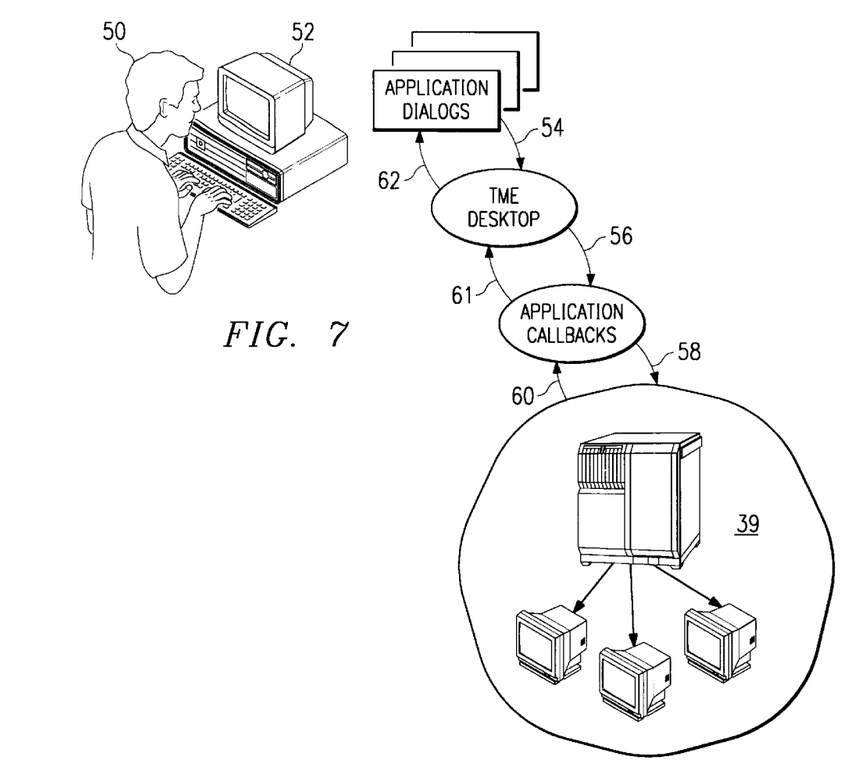
FIG. 7 shows a simplified representation of how a system administrator implements a system management task.

As noted above, however, preferably the load balancing technique is carried out during a data distribution. FIG. 7 illustrates how a data distribution is selected and initiated. In this managed environment, a data distribution is just one of many "system management tasks" that are typically initiated with an object method invocation. Turning now to FIG. 7, each authorized administrator 50 has access to a desktop computer 52 containing one or more icons representing system resources. As administrators interact with dialog screens and menus available from these icons, they are able to change system configurations and manage new resources in the distributed environment, all in a known manner. In particular, when administrator 50 interacts with the desktop, so-called "callbacks" are invoked from the user interface on underlying objects representing some system resource or component. These callbacks are translated into a series of method invocations that actually perform the work and return and results or status to the administrator.

In particular, and with reference to the process flow diagram of FIG. 7, the information flow begins when the administrator 50 selects an icon or interacts with a dialog. The information is then sent to the desktop (usually located at a gateway) at step 54, at which time the appropriate application callback method is invoked at step 56. The callback method then invokes core application methods at step 58, which communicate with the application object(s) to perform some system management operation, as illustrated at step 39. Any return information or state is passed back at steps 60 and 61. If an update to the user interface is required, the desktop 52 interprets the output and updates the dialogs on the administrator's desktop at step 62.

Preferably, the framework includes a task library that enables administrators to create "shell" scripts that can run an any managed node of the enterprise environment. A shell script integrated with a managed node is called a "task." When administrators want to create a task, they provide a machine and a path to an executable file. The executable can be a shell script, a specialized script, a compiled program or any other kind of valid executable. When a task is created, the executable is stored as an attribute in an object database associated with a gateway machine. When the task is needed, the executable file is retrieved from the attribute and is provided to one or more managed nodes. After a task is created, it is added to the task library and displayed as an icon.

As referenced above, the systems management provides an implementation of a CORBA 1.1 Object Request Broker (ORB), basic object adaptor (BOA), and related object services. CORBA 1.1 is a specification for an object-oriented distributed computer systems management architecture provided by The Object Management Group (OMG), a non-profit association of more than 300 companies. CORBA describes the use of the Object Request Broker (ORB) and basic object adaptor (BOA) that provide a mechanism for object invocation and return of results. The specification defines interfaces to a set of low-level object services and enables such services to be integrated in many different language and systems using object encapsulation, service requestor/provider isolation, and interface and implementation separation.

Figure 8:
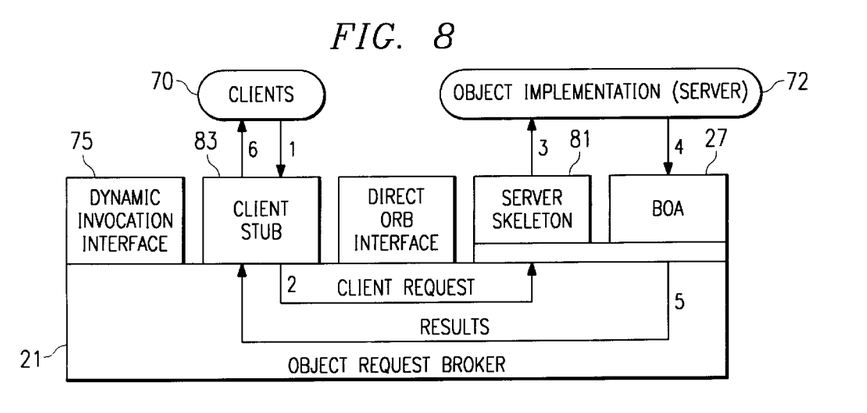
FIG. 8 illustrates the ORB/BOA object-invocation mechanism used to facilitate a data distribution in the invention.

In a CORBA 1.1 implementation as seen in FIG. 8, there are three primary components: a client, an object implementation, and the ORB/BOA. The client 70 is the requestor of a service that is provided by an object implementation 72. The ORB 21 delivers the request from the client 70 to the object implementation 72 through the BOA 27. The object implementation 72 then performs the requested service, and any return data is delivered back to the client. The client and object implementation are isolated from each other, and neither has any knowledge of the other except through their ORB/BOA interfaces. Client requests are independent of the object implementation location and the programming language in which they are implemented.

The ORB delivers the request to the BOA, which activates the process under which the object implementation (e.g., a server) runs. The BOA then invokes the method associated with the request by way of a server skeleton 81. When the method is finished, the BOA manages the termination of the method and coordinates the return of any results to the client. Alternatively, if a request is unknown until runtime, a Dynamic Invocation Interface (DII) 75 is used to build a request used in place of a client stub 83 linked at compile time.

One of the preferred implementations of the gateway component of the system management framework (including the load balancing mechanism) is as a set of instructions in a code module resident in the random access memory of the endpoint. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via a network connection such as the Internet. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims. The present invention, however, is not to be construed as limited to load balancing in the network having any particular topology of gateway and endpoint machines, but may also be useful in load balancing whenever a plurality of computing resources (that are directly or through another network device connectable to a management node) receive a data distribution from the management node. Moreover, the inventive load balancing technique should be useful in any distributed network environment.

Having thus described my invention, what I claim as new and desire to secure by Letters Patent is set forth in the following claims:

What is claimed is:

1. A method of regulating data distribution in a managed network environment managed by a management server servicing a set of gateways, each of which services a set of endpoints, comprising the steps of:

for each subnet of each network path between a gateway and an endpoint, setting a load parameter identifying an amount of network transmission capacity that may be consumed by a particular data distribution over that subnet;

in response to a method invocation that initiates a data distribution from the gateway, determining an effective transmission load for each subnet affected by the data distribution; and if the effective transmission load in a given subnet is greater than the load parameter for the given subnet, altering a characteristic of the data distribution.

2. The method of regulating data distribution as described in claim 1 wherein the characteristic is the rate at which data is distributed in the path.

3. The method as described in claim 2 wherein the rate of data distribution is reduced when the effective transmission load exceeds the load parameter.

4. The method as described in claim 3 wherein the rate of data distribution is reduced by inserting delays in data transmission from the gateway to the endpoint along the network path.

5. The method as described in claim 1 wherein the step of setting a load parameter is performed in the gateway.

6. The method as described in claim 1 wherein the step of determining the effective transmission load is carried out before the data distribution is initiated.

7. A method of regulating data distribution in a managed network environment having a source node that distributes data to a set of endpoints, comprising the steps of:

(a) for each subnet of each network path between the source node and an endpoint, setting a load parameter identifying an amount of network transmission bandwidth that may be consumed by a particular data distribution over that subnet;

(b) prior to initiating a data distribution from the source node, determining an effective transmission load for each subnet that is affected by the data distribution;

(c) determining whether the effective transmission load in any subnet that is affected by the data distribution exceeds the load parameter for that subnet; and (d) if the effective transmission load in any subnet exceeds the load parameter for that subnet, altering a characteristic of the data distribution.

8. The method as described in claim 7 wherein the data distribution is altered by inserting one or more delays in the rate at which data is transmitted over the affected network path from the gateway.

9. The method as described in claim 7 further including the step of repeating steps (b)–(d) for a new data distribution.

10. A computer connectable into a large distributed enterprise having a source node that manages endpoints over one or more network paths each having one or more subnets, the computer comprising:

a processor;

an operating system; and a load balancing mechanism comprising:

means for setting a load parameter identifying an amount of network transmission bandwidth that may be consumed by a particular data distribution over each subnet of at least one network path;

means responsive to invocation of a write operation for calculating an effective transmission load in each subnet affected by the write operation; and means for determining whether the effective transmission load in any subnet affected by the write operation is greater than the load parameter for that subnet and, in response thereto, altering a characteristic of a data distribution.

11. The computer as described in claim 10 wherein the characteristic is the rate at which data is distributed along the network path.

12. The computer as described in claim 11 wherein the means for altering reduces the rate at which data is distributed when the effective transmission load in any subnet affected by the write operation exceeds the load parameter for that subnet.

13. The computer as described in claim 12 further including an interface means for setting the load parameter.

14. The computer as described in claim 10 further including a threads mechanism run by the operating system for executing multiple execution threads.

15. The computer as described in claim 14 wherein process control for each network path controlled by the load balancing mechanism is provided by one of the multiple execution threads.

16. A computer program product for use in a computer having a processor, a memory and means for connecting the computer into a large distributed enterprise wherein computing resources are organized into one or more managed regions, each region being managed by a management server servicing one or more gateway machines, each gateway machine servicing a plurality of endpoint machines, the computer program product comprising:

means for setting a load parameter identifying an amount of network transmission bandwidth that may be consumed by a particular data distribution over a given subnet of a network path between a gateway and an endpoint;

means responsive to invocation of a write operation for calculating an effective transmission load in each subnet affected by the write operation; and means for determining whether the effective transmission load in any subnet affected by the write operation has a predetermined relationship to the load parameter for that subnet and, in response thereto, altering a characteristic of a data distribution.

* * * * *